US010289986B2

(12) United States Patent
Sakamoto et al.

(10) Patent No.: US 10,289,986 B2
(45) Date of Patent: May 14, 2019

(54) INFORMATION PROCESSING SYSTEM, INFORMATION PROCESSING METHOD, INFORMATION PROCESSING DEVICE, AND NON-TRANSITORY STORAGE MEDIUM ENCODED WITH COMPUTER READABLE INFORMATION PROCESSING PROGRAM

(71) Applicant: NINTENDO CO., LTD., Kyoto-shi, Kyoto (JP)

(72) Inventors: Akiya Sakamoto, Kyoto (JP); Takayoshi Sato, Kyoto (JP); Norihito Ito, Kyoto (JP); Stephen Mortimer, Redmond, WA (US)

(73) Assignee: NINTENDO CO., LTD., Kyoto (JP)

( * ) Notice: Subject to any disclaimer, the term of this patent is extended or adjusted under 35 U.S.C. 154(b) by 604 days.

(21) Appl. No.: 14/725,428

(22) Filed: May 29, 2015

(65) Prior Publication Data

US 2016/0034860 A1 Feb. 4, 2016

Related U.S. Application Data

(60) Provisional application No. 62/030,253, filed on Jul. 29, 2014.

(30) Foreign Application Priority Data

Aug. 1, 2014 (JP) .................................. 2014-157431

(51) Int. Cl.
*G07F 17/32* (2006.01)
*G06Q 20/06* (2012.01)
(Continued)

(52) U.S. Cl.
CPC ....... *G06Q 20/065* (2013.01); *G06F 3/04842* (2013.01); *G06Q 20/06* (2013.01);
(Continued)

(58) Field of Classification Search
None
See application file for complete search history.

(56) References Cited

U.S. PATENT DOCUMENTS

2008/0078758 A1* 4/2008 Shimura ................. A63F 13/10
219/717
2009/0253517 A1* 10/2009 Bererton ................. A63F 13/12
463/42
(Continued)

FOREIGN PATENT DOCUMENTS

JP 2008-299556 12/2008
JP 2009-187522 8/2009
(Continued)

OTHER PUBLICATIONS

Nintendo, Flipnote Studio 3d, Jul. 15, 2013, https://web.archive. org/web/20130715064246/http://flipnotestudio3d.nintendo.com/ pp. 1-3.*
(Continued)

*Primary Examiner* — Tramar Harper
(74) *Attorney, Agent, or Firm* — Nixon & Vanderhye PC

(57) ABSTRACT

An exemplary embodiment provides a configuration allowing promotion of communication among users by making use of exchange of a virtual currency. An information processing system includes a providing module configured to provide a content created by a first user to a second user and a management module configured to manage a virtual currency in association with each of the first and second users. The management module makes change such that the entirety or a part of the virtual currency associated with the second user is associated with the first user in response to an instruction from the second user, as appreciation of the content created by the first user.

17 Claims, 12 Drawing Sheets

(51) Int. Cl.
*G06F 3/0484* (2013.01)
*G06Q 20/22* (2012.01)
*H04L 29/08* (2006.01)

(52) U.S. Cl.
CPC ....... *G06Q 20/223* (2013.01); *G07F 17/3225* (2013.01); *G07F 17/3244* (2013.01); *H04L 67/1095* (2013.01)

(56) References Cited

U.S. PATENT DOCUMENTS

| | | | | |
|---|---|---|---|---|
| 2010/0197389 | A1* | 8/2010 | Ueda | A63F 13/12 463/30 |
| 2010/0292003 | A1* | 11/2010 | Kim | A63F 13/358 463/31 |
| 2011/0212762 | A1* | 9/2011 | Ocko | G06Q 10/10 463/25 |
| 2011/0319170 | A1* | 12/2011 | Shimura | H04W 4/203 463/42 |
| 2012/0159348 | A1* | 6/2012 | Stroomer | G06F 3/0481 715/751 |
| 2012/0302328 | A1* | 11/2012 | Walker | G07F 17/32 463/25 |
| 2013/0326355 | A1* | 12/2013 | Pak | G06F 3/048 715/733 |
| 2014/0031112 | A1* | 1/2014 | Dezaki | A63F 13/40 463/29 |
| 2014/0162776 | A1* | 6/2014 | Lucas | A63F 13/10 463/31 |
| 2014/0179440 | A1* | 6/2014 | Perry | A63F 13/803 463/42 |
| 2014/0213343 | A1* | 7/2014 | Zhao | G07F 17/3244 463/25 |
| 2016/0082356 | A1* | 3/2016 | Ukida | A63F 13/355 463/29 |

FOREIGN PATENT DOCUMENTS

| | | |
|---|---|---|
| JP | 2012-215926 | 11/2012 |
| JP | 2013-257784 | 12/2013 |
| JP | 2014-002620 | 1/2014 |
| WO | 2012/111322 | 7/2014 |

OTHER PUBLICATIONS

Nintendolife, Flipnote Studio 3D World Gallery Priced and Detailed for Europe, Jul. 30, 2013, (https://web.archive.org/web/20130730073140/http://www.nintendolife.com/news/2013/07/flipnote_studio_3d_world_gallery_priced_and_detailed_for_europe), pp. 1-3.*
Nintendo nederland, Nintendo Direct Mini—Flipnote Studio 3D (Nintendo 3DS), (https://www.youtube.com/watch?v=IQX-ManOHTo), p. 1.*
SuperStarGuy79, Flipnote 3D [JP Version] Some Feature and World Gallery, Jul. 29, 2013, https://www.youtube.com/watch?v=vWGjQJiGJUQ , p. 1.*
Leena Kumari, Flipnote Studio 3D Official Trailer, May 6, 2013, https://www.youtube.com/watch?v=YmK9tLGIPuY , p. 1.*
"Ugoku Memocho 3D: World Ugomemo Gallery for Having Fun with All Kinds of People," [online], Nintendo [Searched on Jun. 26, 2014], the Internet <URL: http://www.nintendo.co.jp/3ds/eshop/jkzj/world.html> (4 pages) and it's English Translation (4 pages).

* cited by examiner

INFORMATION PROCESSING SYSTEM, INFORMATION PROCESSING METHOD, INFORMATION PROCESSING DEVICE, AND NON-TRANSITORY STORAGE MEDIUM ENCODED WITH COMPUTER READABLE INFORMATION PROCESSING PROGRAM

This nonprovisional application claims the benefit and priority of the following applications, the entire contents of which are incorporated herein by reference for all purpose:
(1) U.S. Provisional Application No. 62/030,253, filed on Jul. 29, 2014, entitled "Information Processing System, Information Processing Method, Information Processing Device, and Information Processing Program"; and
(2) Japanese Patent Application No. 2014-157431 filed with the Japan Patent Office on Aug. 1, 2014.

FIELD

The technology herein relates to an information processing system in which a plurality of users interact with one another, an information processing method, an information processing device, and a non-transitory storage medium encoded with a computer readable information processing program.

BACKGROUND AND SUMMARY

A system in which one can post one's own work or can evaluate any work posted by others by using coins given by purchasing a voucher has been known. In such system, coins cannot be given unless a voucher is purchased, and given coins can be used only for one's own activities.

An exemplary embodiment provides a configuration allowing promotion of communication among users by making use of exchange of a virtual currency.

Another exemplary embodiment provides a configuration allowing promotion of communication by exchanging an acquisition acquired in game processing among users.

An exemplary embodiment provides an information processing system that includes a providing module configured to provide a content created by a first user to a second user and a management module configured to manage a virtual currency in association with each of the first and second users. The management module makes change such that the entirety or a part of the virtual currency associated with the second user is associated with the first user in response to an instruction from the second user, as appreciation of the content created by the first user.

In the exemplary embodiment, the providing module may include at least one of a function to present the content to the second user and a function to have the second user make use of the content.

In the exemplary embodiment, the information processing system may further include a first holding module configured to hold the content created by the first user in a manner sharable with other users.

In the exemplary embodiment, the first holding module may hold contents created by a plurality of first users. The information processing system may further include a selection module configured to select a first user to which the virtual currency associated with the second user is to be transferred, in response to an instruction from the second user.

In the exemplary embodiment, the first holding module may hold comments from the first user together with the content from the first user, and the providing module may provide the content and the comments from the first user together.

In the exemplary embodiment, the information processing system may further include a game processing module configured to perform game processing. When a prescribed condition is satisfied in the game processing through play by any user, the management module may add the virtual currency associated with that user.

In the exemplary embodiment, the information processing system may further include an acceptance module configured to accept a response to any content from the second user and a second holding module configured to hold the response from the second user in association with a content of interest.

In the exemplary embodiment, the management module may give, with such change that the virtual currency associated with the second user is associated with the first user, a reward corresponding to the virtual currency subjected to change, in association with the second user.

In the exemplary embodiment, the reward may include an item which can be used for communication among users.

In the exemplary embodiment, the management module may decrease, in response to an instruction from a user, the virtual currency associated with that user and give an item which can be used for creation of a content to that user.

In the exemplary embodiment, the management module may add to each of the virtual currency associated with the first user and the virtual currency associated with the second user in response to provision of the content created by the first user to the second user.

An exemplary embodiment provides an information processing method performed by one computer or a plurality of computers. The information processing method includes the steps of providing a content created by a first user to a second user and managing a virtual currency in association with each of the first and second users. The managing step includes the step of making change such that the entirety or a part of the virtual currency associated with the second user is associated with the first user in response to an instruction from the second user, as appreciation of the content created by the first user.

An exemplary embodiment provides an information processing device that includes a module configured to access a content created by a first user and a module configured to transmit to a management module configured to manage a virtual currency in association with each of first and second users, a command for making change such that the entirety or a part of the virtual currency associated with the second user is associated with the first user, in response to an input from the second user as appreciation of the content created by the first user.

An exemplary embodiment provides a non-transitory storage medium encoded with a computer readable information processing program executed by one or more processors. The information processing program causes the one or more processors to perform the steps of accessing a content created by a first user and transmitting to a management module configured to manage a virtual currency in association with each of first and second users, a command for making change such that the entirety or a part of the virtual currency associated with the second user is associated with the first user, in response to an input from the second user as appreciation of the content created by the first user.

An exemplary embodiment provides an information processing system that includes a sharing module configured to allow a content created by a user to be shared with other users, a game processing module configured to perform game processing, and a giving module configured to give an acquisition to the user in accordance with execution of the game processing. The sharing module transfers the acquisition given by the giving module to another user in response to an instruction from the user.

In the exemplary embodiment, the acquisition may include at least one of a virtual currency and an item relating to the game processing.

In the exemplary embodiment, the information processing system may further include a posting acceptance module configured to accept a posting of a content created by the user while the game processing is performed is further included. The sharing module may allow a posting accepted by the posting acceptance module to be shared.

In the exemplary embodiment, the posting acceptance module may accept a posting of comments from a creator of a content.

In the exemplary embodiment, the sharing module may allow the content and the comments together to be shared with other users.

In the exemplary embodiment, the sharing module may give a reward to a first user in response to transfer of the acquisition of the first user to a second user.

An exemplary embodiment provides an information processing method performed by one computer or a plurality of computers. The information processing method includes the steps of allowing a content created by a user to be shared with other users, performing game processing, and giving an acquisition to the user in accordance with execution of the game processing. The step of allowing a content to be shared includes the step of transferring the acquisition given in the giving step to another user in response to an instruction from the user.

An exemplary embodiment provides an information processing device that includes a game processing module configured to perform game processing, which can be connected to a sharing module configured to allow a content created by a user to be shared with other users, and a module configured to transmit a command to transfer an acquisition given to the user in accordance with execution of the game processing to another user in response to an instruction from the user.

An exemplary embodiment provides a non-transitory storage medium encoded with a computer readable information processing program executed by one or more processors. The information processing program causes the one or more processors to perform the steps of performing game processing, which can be connected to a sharing module configured to allow a content created by a user to be shared with other users, and transmitting a command to transfer an acquisition given to the user in accordance with execution of the game processing to another user in response to an instruction from the user.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
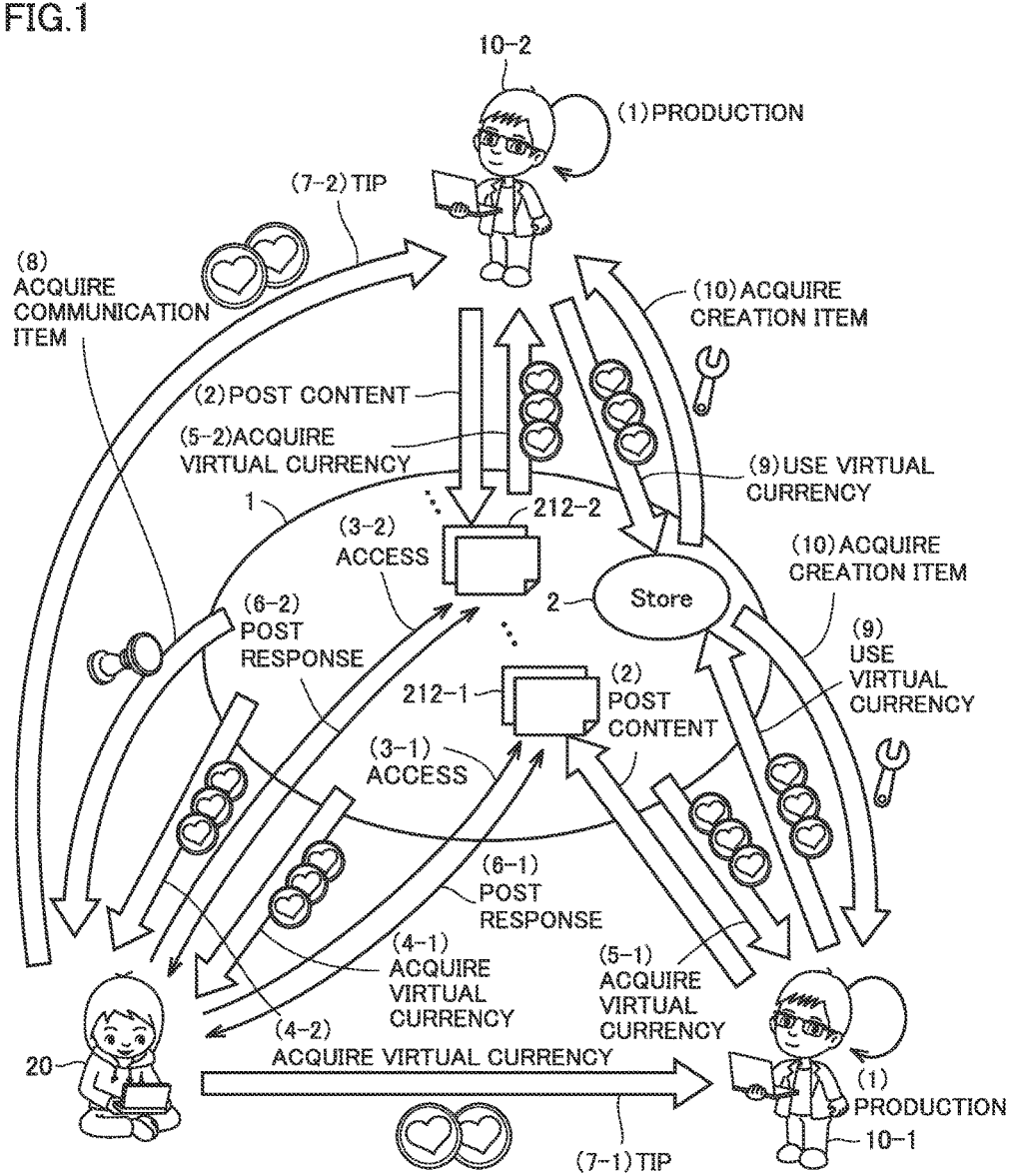
FIG. 1 shows an exemplary illustrative non-limiting schematic diagram showing overall processing provided by an information processing system in the present embodiment.

The present embodiment will be described in detail with reference to the drawings. The same or corresponding elements in the drawings have the same reference characters allotted and description thereof will not be repeated.

A. Overview

Overview of processing in an information processing system 1 in the present embodiment will initially be described.

Referring to FIG. 1, information processing system 1 provides a function to share a content created by a certain user with other users. Namely, information processing system 1 allows interaction among a plurality of users, and for the sake of convenience of description, a user who creates a content is referred to as a "creator" and a user provided with the content created by the creator is also referred to as a "player". Since the "creator" and the "player" are defined for each content, a user who is a "creator" of a certain content can be a "player" of a content created by another user, and in contrast, a user who is a "player" of a certain content can be a "creator" when the user himself/herself creates a content.

Though an information processing system in which a game can be created as a content will mainly be exemplified in the description below, a content is not limited to a game, and for example, any creation such as a motion picture, a still picture, and computer graphics is applicable. Such a content is also referred to as a user-generated content (UGC).

In information processing system 1, each user can possess a virtual currency, and the possessed virtual currency is managed for each user. Namely, information processing system 1 has a function to manage a virtual currency in association with each of a plurality of users. The virtual currency is an object having a countable specific value to which some value is given within information processing system 1. A name similar to a currency distributed in real world may be used or an original name not relating to a currency may be used as a name of the virtual currency.

In information processing system 1 in the present embodiment, a player accesses any content and can give a virtual currency to a creator who has created the content as appreciation of that content. By receiving a virtual currency from the player, the creator can obtain a motivation for creation of a content. On the other hand, the player can acquire a special item as a reward for giving a virtual currency to the creator of the content he/she liked. For the player, acquisition of a special item is a motivation to give a virtual currency he/she possesses to the creator. Alternatively, as a player accesses a content, a virtual currency may be given to both of the player and a creator who has created the content.

Thus, the creator is provided with a motivation to create a new content, and the player is provided with a motivation to access a content and a motivation to give a virtual currency to the creator. Thus, creation and use of a content are invigorated in the system as a whole.

FIG. 1 exemplifies a case in which creators 10-1 and 10-2 and a player 20 interact with one another. Creators 10-1 and 10-2 may also collectively be referred to as "creator 10". Each process will be described below in detail.

a1: Creation of Content

It is assumed that creator 10-1 creates one content or a plurality of contents 212-1 and creator 10-2 creates one content or a plurality of contents 212-2 ((1) production). Then, creators 10-1 and 10-2 upload created contents 212-1 and 212-2 to information processing system 1 ((2) post content).

Information processing system 1 holds these posted contents 212-1 and 212-2. Namely, information processing system 1 has a function to hold contents 212-1 and 212-2 created by respective creators 10-1 and 10-2. This function for holding allows sharing of the content created by a user with other users.

a2: Provision of Content

In such a state, it is assumed that player 20 accesses content 212-1 ((3-1) access). Information processing system 1 provides content 212-1 of interest to player 20 in response to the access from player 20. Namely, information processing system 1 has a function to provide content 212-1 created by creator 10-1 to player 20.

For providing a content to player 20, such a form as displaying the content to player 20 or having player 20 make use of the content is assumed. Namely, information processing system 1 has a function to present a content to player 20 and/or a function to have player 20 make use of a content.

In a case that content 212-1 is a game content, player 20 can play and enjoy the game content. An environment for playing a game content may be implemented by a server device (which will be described later) which is a subject holding content 212-1 or may be implemented by an information processing device (which will be described later) used by player 20. Alternatively, the server device and the information processing device may implement an environment for executing a game content in coordination with each other. In any form of mount, information processing system 1 has a function to perform game processing by using at least a part of a content.

When content 212-1 is provided to player 20, information processing system 1 gives a virtual currency to both of player 20 and creator 10-1 who is the creator of the content. Player 20 is given a virtual currency as a reward for access to content 212-1 ((4-1) acquire virtual currency), and creator 10-1 is given a virtual currency as a reward for access by another user to content 212-1 created by creator 10-1 ((5-1) acquire virtual currency). Namely, in response to provision of content 212-1 created by creator 10-1 to player 20, information processing system 1 adds to each of the virtual currency associated with creator 10-1 and the virtual currency associated with player 20.

In a case that content 212-1 is a game content, for a reward for player 20 and/or a reward for creator 10-1, a virtual currency as an acquisition may be given only when player 20 plays content 212-1 and beats the game or achieves a prescribed score. In other words, a virtual currency is not given simply when player 20 accesses a game content, but an acquisition (typically, a virtual currency) may be given only when player 20 plays a game content and a prescribed condition is satisfied in the game content. Here, an amount of a virtual currency to be given may be determined in accordance with a result of play. For example, as a time period required for beating a game is shorter, an amount of a virtual currency to be given may be greater. Thus, when a prescribed condition is satisfied in game processing through play by any user, information processing system 1 adds to a virtual currency associated with that user.

The acquisition obtained in game processing is not limited to a virtual currency, and an item relating to game processing (for example, a special item with which a game can advantageously proceed) may be applicable.

Player 20 can post any response to content 212-1 which he/she accessed ((6-1) post response). A response indicates feedback from each player 20 who has experienced content 212-1, and can include, for example, a message, a hand-drawn image, and a social button. A response posted by player 20 is stored in association with content 212-1. Namely, information processing system 1 has a function to accept a response to any content from a player and a function to hold the response from the player in association with a content of interest.

When another player accesses the same content 212-1, the response posted earlier may be displayed to another user. Namely, information processing system 1 may have a function to provide (or display) a content and a response associated with the content. By displaying a response posted by another player together with the content to a player who has accessed the content, appreciation of each content can be shared among players. Namely, information processing system 1 can share an accepted posting with another user (a content and comments together).

As in the processing described above, player 20 can access to content 212-2 ((3-2) access), a virtual currency can be given to player 20 ((4-2) acquire virtual currency), a virtual currency can be given to creator 10-2 ((5-2) acquire virtual currency), and player 20 can post any response to content 212-2 ((6-2) post response).

a3: Acquisition of Tip and Communication Item

When player 20 plays, for example, content 212-1 and is satisfied with work thereof, the player can give creator 10-1 who has created content 212-1 a virtual currency possessed by the player himself/herself ((7-1) tip). Namely, a player can access any content and can give a virtual currency to a creator who has created the content as appreciation of that content.

Though giving a virtual currency possessed by a player himself/herself may also be denoted as "tip" for the sake of convenience of description, the term "tip" means "giving a virtual currency to a creator who has created any content as appreciation of that content."

From a point of view of information processing system 1, a function to manage a virtual currency allows such change that the entirety or a part of a virtual currency associated with a second user (player 20) is associated with a first user (creator 10) in response to an instruction from the second user (player 20), as appreciation of a content created by the first user (creator 10).

Alternatively, when player 20 plays content 212-2 and is satisfied with work thereof, he/she can give a virtual currency possessed by the player himself/herself to creator 10-2 who has created content 212-2 ((7-2) tip).

Thus, player 20 can give a virtual currency possessed by the player himself/herself to any content (that is, creator 10). Namely, information processing system 1 has a function to select creator 10 to which a virtual currency associated with player 20 is to be transferred in response to an instruction from player 20.

Player 20 can receive a reward different from a virtual currency corresponding to the virtual currency he/she has given, as compensation for giving the virtual currency possessed by the player himself/herself to creator 10 who has created the content, as appreciation of any content ((8) acquire communication item). From a point of view of the system, with such change that a virtual currency associated with the second user (player 20) is associated with the first user (creator 10), information processing system 1 gives a reward corresponding to the virtual currency subjected to change, in association with the second user (player 20).

This reward different from the virtual currency is given by information processing system 1, and it may be of any type so long as it motivates player 20 to give a virtual currency possessed by the player himself/herself to creator 10. In the description below, an example in which an item which can be used by player 20 for communication with another user (hereinafter also referred to as a "communication item") is employed as a reward different from a virtual currency is shown. Namely, a reward different from a virtual currency includes an item which can be used for communication among users.

A communication item is exemplified by a special "stamp" which can be added to a response at the time when player 20 posts a response. If this special "stamp" can be acquired only when a virtual currency possessed by the player himself/herself is given to creator 10, it will produce a feeling of "rareness" or "premium" and can give an effective motivation to player 20.

a4: Acquisition of Creation Item

Creator 10 can also use a virtual currency acquired by providing a content created by the creator himself/herself to player 20 and/or receiving a virtual currency from player 20, for the purpose of supporting creation of a new content. For example, a function as a store 2 is provided in information processing system 1, and an item which can be used for creation of a content (hereinafter also referred to as a "creation item") can be acquired in exchange for a virtual currency possessed by the creator himself/herself. Thus, in information processing system 1, a virtual currency can be used for compensation for an item which can be used for creation of a content. Namely, in response to an instruction from a user, information processing system 1 decreases a virtual currency associated with the user and gives the user an item which can be used for creation of a content.

More specifically, creator 10 can acquire a creation item ((10) acquire creation item) by performing an operation to pay store 2 a virtual currency possessed by the creator himself/herself ((9) use virtual currency). By acquiring such a creation item, creator 10 can create a more unique content.

Not only as compensation for a virtual currency possessed by a creator himself/herself, a creation item may be purchased with cash (that is, a currency circulated in real world). This is because, when a creation item with which a unique content can be created is provided, creator 10 can have a motivation to desire acquisition of that creation item even with payment of cash.

B. System Configuration

A configuration of information processing system 1 in the present embodiment will now be described.

Figure 2:
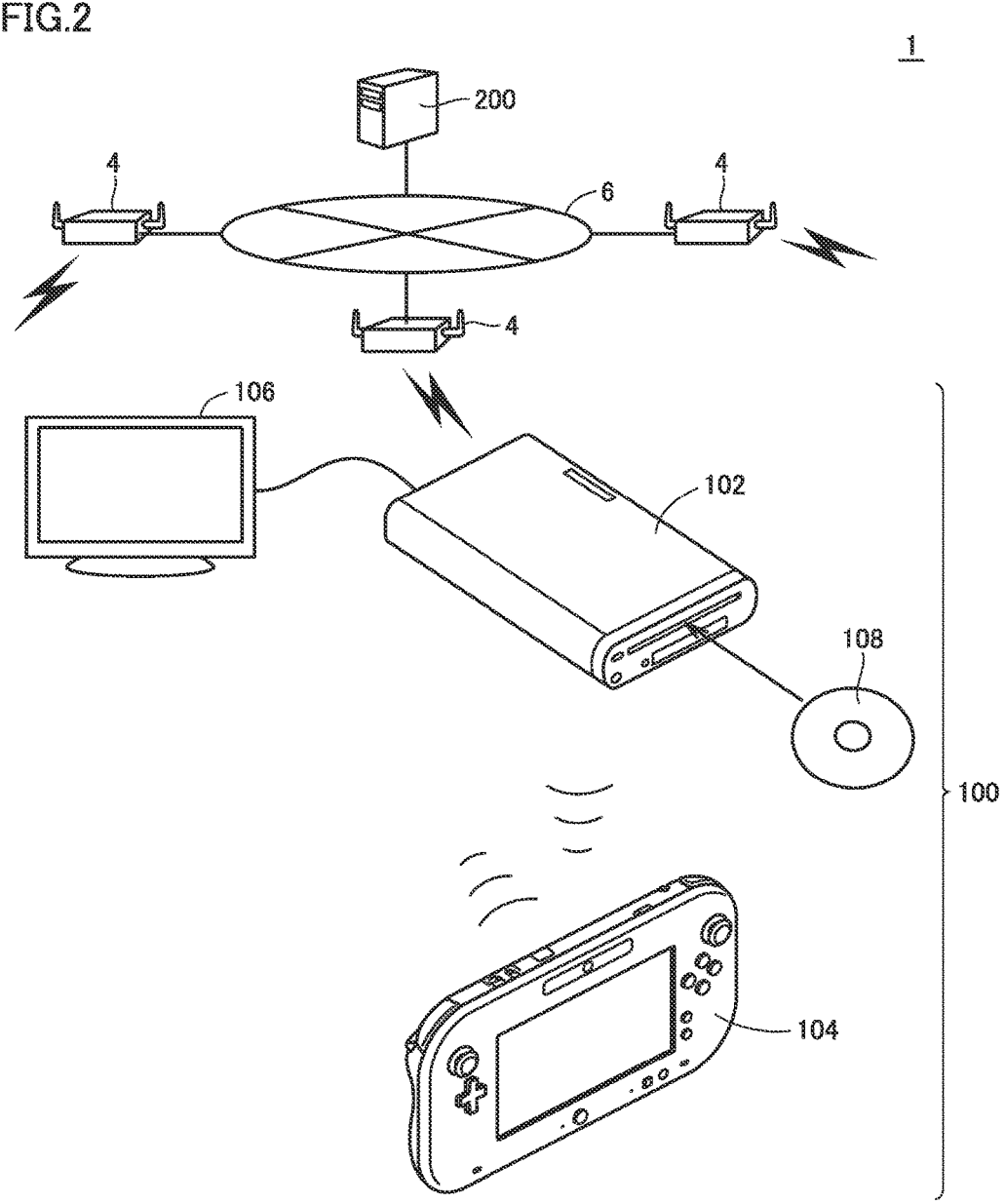
FIG. 2 shows an exemplary illustrative non-limiting schematic diagram showing a configuration example of the information processing system in the present embodiment.

Referring to FIG. 2, information processing system 1 includes one information processing device 100 or a plurality of information processing devices 100 and one server device 200 or a plurality of server devices 200. Each of information processing devices 100 and server device 200 are connected to each other through a network 6.

Though FIG. 2 shows a stationary game device by way of example of information processing device 100, the information processing device is not limited thereto, and a general-purpose personal computer may be employed or a portable game device may be employed. Though a configuration example in which information processing device 100 establishes wireless communication with an access point 4 and is thereby connected to network 6 is shown, the configuration is not limited thereto, and information processing device 100 should only be connected to network 6 with any method such as wired connection.

Information processing device 100 includes a main unit 102, a controller 104, and a display 106.

Main unit 102 is a computer performing various types of processing in information processing device 100, and can execute a system program and an application which are installed in advance, an application held by server device 200, and an application downloaded from server device 200. Main unit 102 outputs a video image or voice and sound generated as a result of execution of a program or an application to display 106. An application installed in main unit 102 is typically distributed through such an optical storage medium 108 as a digital versatile disk (DVD) or any other non-transitory storage media. Main unit 102 is configured to be able to communicate with controller 104, and it can execute an application in response to an operation by a user through controller 104 and also output information in accordance with a result of execution thereof to controller 104.

Main unit 102 is connected to network 6 as it establishes wireless communication with access point 4. Main unit 102 exchanges data with server device 200 present on network 6. Wireless communication is established between main unit 102 and access point 4, for example, through wireless LAN in compliance with IEEE802.11n specifications.

Data is exchanged between main unit 102 and controller 104 typically through wireless communication. For such wireless communication, for example, wireless LAN in compliance with IEEE802.11n specifications, a scheme in compliance with specifications of Bluetooth (trademark), or infrared communication in compliance with infrared data association (IRDA) specifications is employed.

Controller 104 includes an operation portion accepting an operation by a user, transmits data indicating the operation by the user to main unit 102, and includes a display portion displaying an image from main unit 102 to the user.

Though a configuration example in which information processing system 1 is implemented by using a single server device 200 is shown for the sake of convenience of description, a plurality of server devices 200 may be employed to implement parallel processing and/or distributed processing. In contrast, a single computer may implement the entire information processing in the present embodiment. In this case, respective terminals used by a plurality of users exchange information with a single computer, so that information processing as will be described below is implemented.

C. Device Configuration

Each device implementing information processing system 1 will now be described.

1: Main Unit 102

Figure 3:
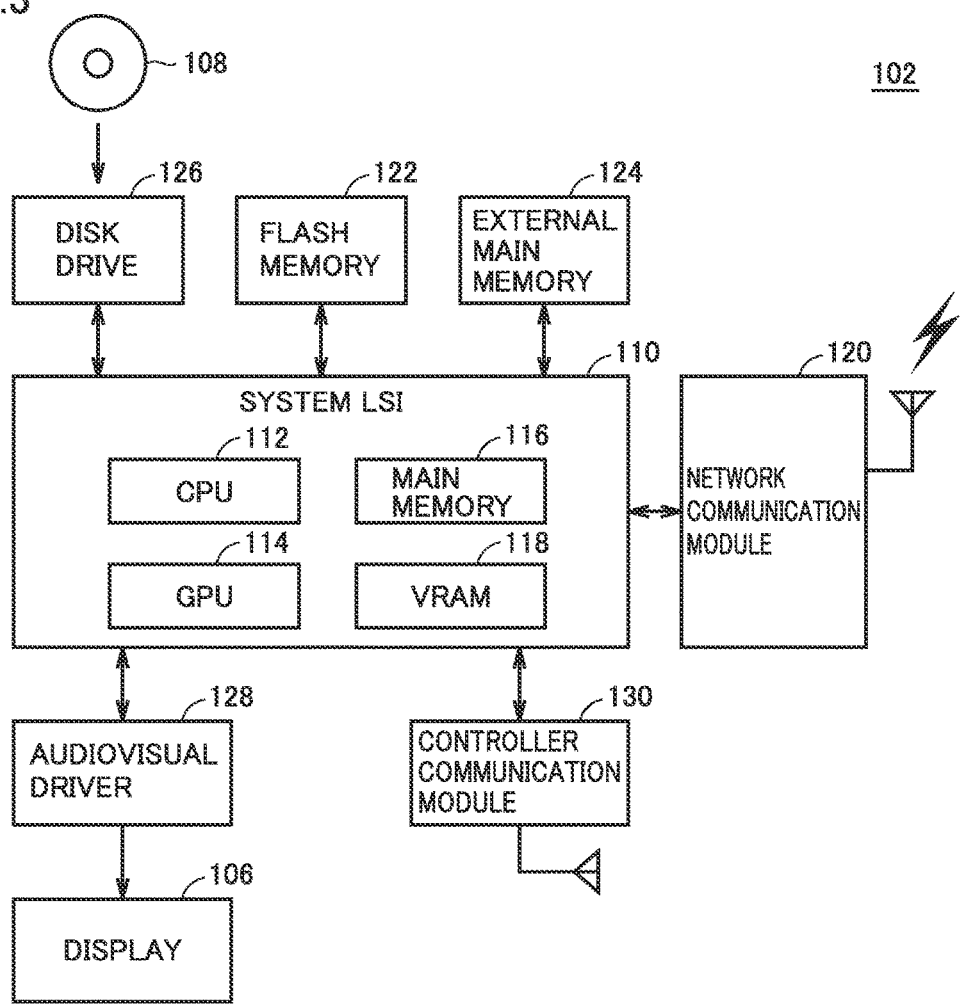
FIG. 3 shows an exemplary illustrative non-limiting schematic diagram showing a configuration example of a main unit of an information processing device included in the information processing system in the present embodiment.

Referring to FIG. 3, main unit 102 includes a system large scale integration (LSI) 110, a network communication module 120, a flash memory 122, an external main memory 124, a disk drive 126, an audiovisual output driver 128, and a controller communication module 130.

System LSI 110 is a processing engine in main unit 102 and corresponds to a main control unit. System LSI 110 includes a central processing unit (CPU) 112, a graphical processing unit (GPU) 114, a main memory 116, and a video random access memory (VRAM) 118. CPU 112 executes a system program or an application. GPU 114 performs processing mainly in connection with display. Main memory 116 functions as a working memory holding temporary data necessary for execution of a program in CPU 112. VRAM 118 functions as a working memory for displaying an image generated through processing in GPU 114. All components included in system LSI 110 do not have to be mounted on a single LSI, and some of them may be mounted outside the LSI. For example, a function of each of CPU 112 and GPU 114 may be implemented by a single chip.

Flash memory 122 can be accessed from system LSI 110 and stores a system program or an application in a non-volatile manner. External main memory 124 functions as a working memory in coordination with main memory 116 in system LSI 110.

Disk drive 126 reads data from optical storage medium 108 and outputs the read data to system LSI 110.

Audiovisual output driver 128 outputs a video signal and an audio signal output from system LSI 110 to display 106.

Network communication module 120 is a communication interface for communication with network 6. Controller communication module 130 is a communication interface for communication with controller 104. A configuration in accordance with each communication scheme is adopted for these communication modules.

c2: Server Device 200

Figure 4:
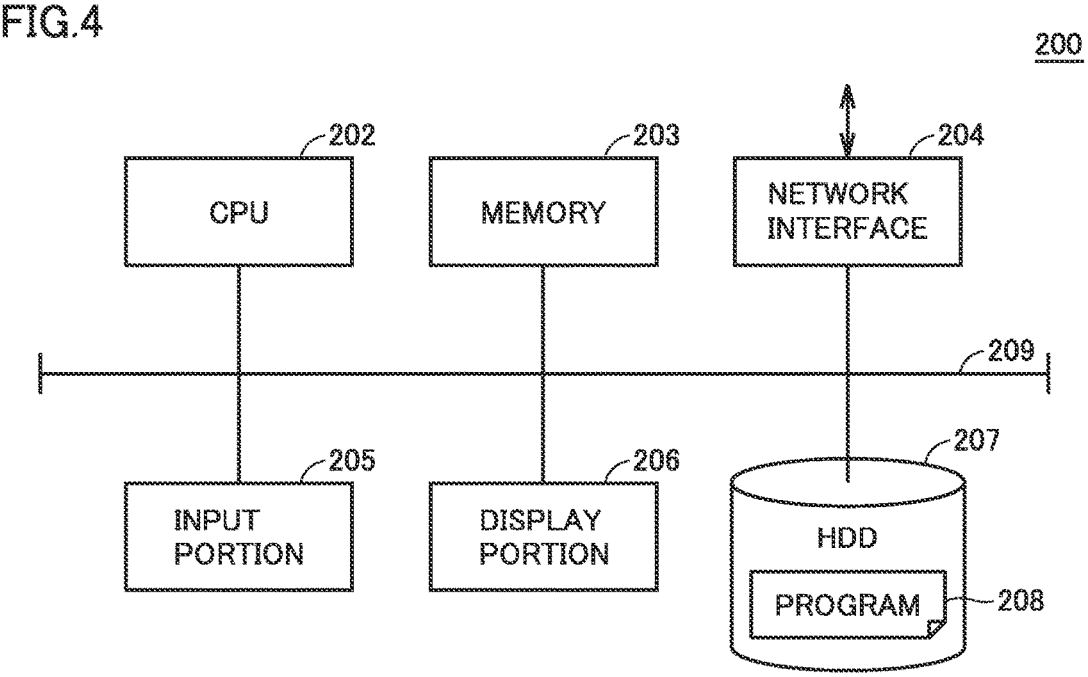
FIG. 4 shows an exemplary illustrative non-limiting schematic diagram showing a configuration example of a server device included in the information processing system in the present embodiment.

Referring to FIG. 4, server device 200 is typically a computer in accordance with a general-purpose architecture, and includes a CPU 202, a memory 203, a network interface 204, an input portion 205, a display portion 206, and a hard disk (HDD) 207. These components are connected to one another through an internal bus 209. Hard disk 207 stores various programs 208 to be executed by server device 200.

Though FIG. 4 exemplifies server device 200 including a single CPU 202 for the sake of convenience of description, the number of CPUs and a type of the CPU are selected as appropriate in accordance with required processing capacity. Alternatively, such a configuration that a plurality of processors are in coordination with one another through a network or a bus may be adopted.

Since a function of each component shown in FIG. 4 has been known, detailed description thereof is not given here.

D. Functional Configuration of Server Device 200

A functional configuration of server device 200 of information processing system 1 will now be described.

Figure 5:
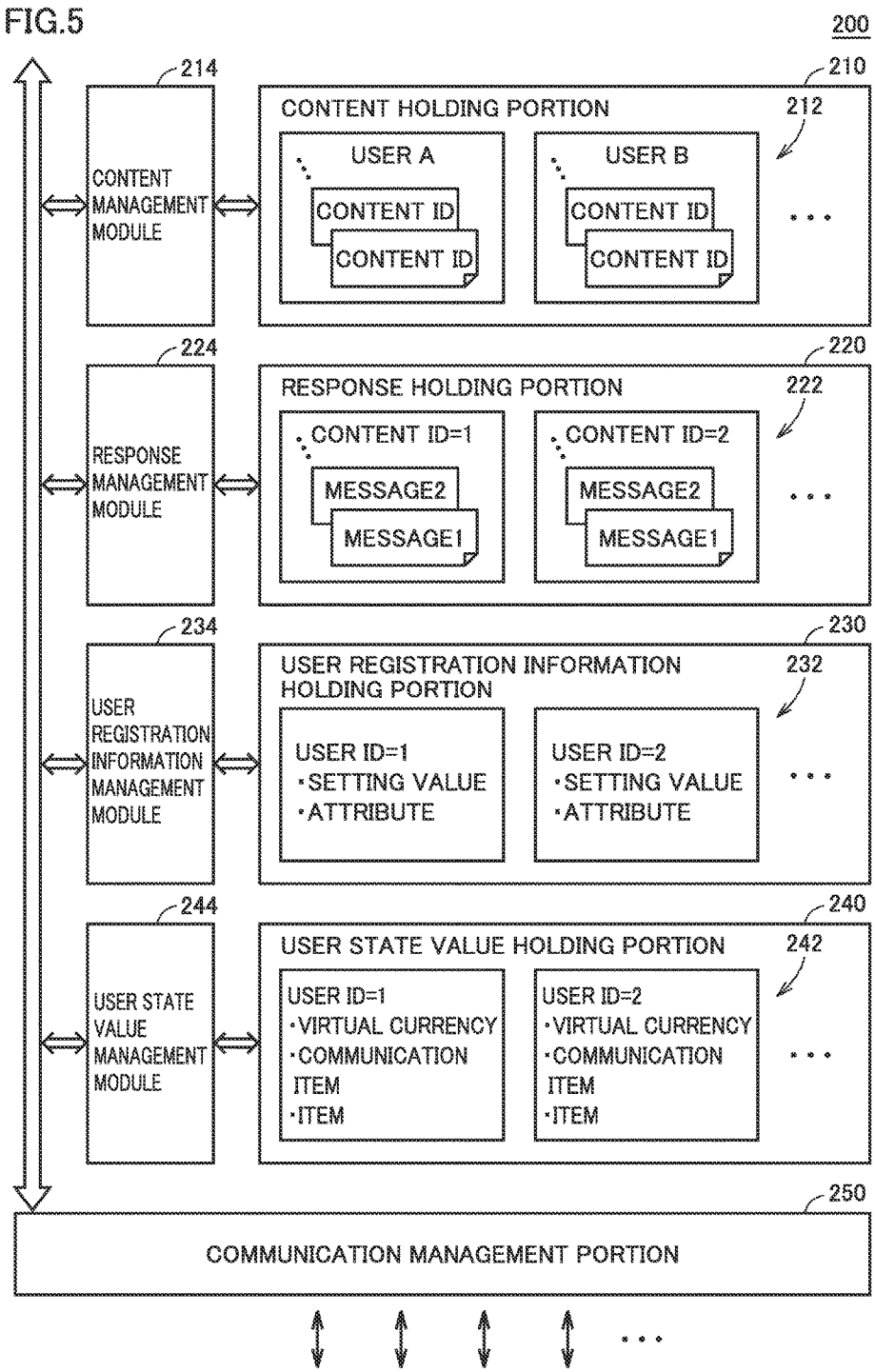
FIG. 5 shows an exemplary illustrative non-limiting schematic diagram showing a functional configuration of the server device included in the information processing system in the present embodiment.

Referring to FIG. 5, server device 200 includes, as its functional configuration, a content holding portion 210, a content management module 214, a response holding portion 220, a response management module 224, a user registration information holding portion 230, a user registration information management module 234, a user state value holding portion 240, a user state value management module 244, and a communication management portion 250. Typically, content holding portion 210, response holding portion 220, user registration information holding portion 230, and user state value holding portion 240 are implemented by providing an area for holding data in memory 203 and/or hard disk 207 of server device 200. Other components are typically implemented by execution of program 208 by CPU 202 of server device 200.

Content holding portion 210 holds content 212 created by a user (creator). Typically, since each of a plurality of users can create one content 212 or a plurality of contents 212, content holding portion 210 preferably holds content 212 for each creator (for each user). As will be described later, a creator can add comments to a created content. Thus, content holding portion 210 holds a content created by each of the plurality of users. When comments are added to content 212, content holding portion 210 accepts a posting of comments from a creator of a content and holds the comments from the creator together with the content from the creator.

Content management module 214 performs such processing as addition, deletion, and modification of content 212 held in content holding portion 210 and provision of content 212 to a user. More specifically, when content management module 214 receives content 212 created by a creator through communication management portion 250, it has content holding portion 210 store received content 212 in association with the user. In response to a request from the user, content management module 214 provides requested content 212 held in content holding portion 210 to the user through communication management portion 250. Namely, content management module 214 provides a content created by a certain user (creator) to another user (player). When comments are added to a content, content management module 214 provides the content and the comments from a creator together.

Response holding portion 220 holds a response 222 posted by a user in relation with content 212 held in content holding portion 210. Typically, since a plurality of users can post responses 222 to the same content 212, response holding portion 220 preferably holds response 222 for each content. Namely, response holding portion 220 holds response 222 from a user (player) in association with each content 212. Identification information indicating a user who has posted response 222 is also added to each response 222.

Response management module 224 performs such processing as addition, deletion, and modification of response 222 held in response holding portion 220 and provision of response 222 to a user. More specifically, when response management module 224 receives response 222 to any content 212 posted by a user (player) through communication management portion 250, it has response holding portion 220 store received response 222 in association with content 212. Namely, in response to an operation by a user (player) to whom any content 212 has been provided, response management module 224 updates response 222 associated with content 212.

When any content 212 is provided to a user, response management module 224 also provides associated response 222 together. Namely, response management module 224 provides response 222 posted by a certain user (player) to certain content 212 also to another user (player) who is going to use content 212.

User registration information holding portion 230 holds registration information 232 about a user. For example, when a function allowing each user to create any character (an avatar) is mounted, a setting value defining the created character may be included in registration information 232. In addition, various attributes such as a sex, a birthday, and a blood type may be included in registration information 232. User registration information holding portion 230 holds registration information 232 for each user.

User registration information management module 234 performs processing such as addition, deletion, and modification of registration information 232 held in user registration information holding portion 230. More specifically, when any user operates information processing device 100 and makes user registration, user registration information management module 234 has user registration information holding portion 230 store registration information 232 indicating registered details. In a case that content management module 214 provides a content and/or response management module 224 provides a response, user registration information management module 234 may provide information on a user associated with a provided content (for example, an image of a registered character) and/or information on a user associated with a provided response, respectively.

User state value holding portion 240 holds state value information 242 of each user. State value information 242 includes such information as a current value for a virtual currency possessed by each user, an acquired communication item, and an acquired item.

User state value management module 244 updates state value information 242 held in corresponding user state value holding portion 240 in response to an operation by a user. For example, when a certain user (player) performs an operation to give a virtual currency to another user (creator) as appreciation of a content created by the user, user state value management module 244 updates state value information 242 associated with each user and implements transfer of a virtual currency between the users. When a user (player) makes use of a certain content, user state value management module 244 updates state value information 242 so as to give a virtual currency to the user (creator) who has created the content and to the user (player) who has made use of the content. User state value management module 244 thus manages a virtual currency in association with each of a plurality of users.

Communication management portion 250 manages communication with one information processing device 100 or a plurality of information processing devices 100. Namely, when an operation by a user is received from any information processing device 100, communication management portion 250 transmits details thereof to a corresponding module and transmits a result of processing in server device 200 to information processing device 100 of interest.

Though FIG. 5 shows a configuration example in which all functions are mounted on server device 200 for the sake of convenience of description, the functions may be distributed as appropriate among a plurality of server devices. For example, content holding portion 210, content management module 214, user state value holding portion 240, and user state value management module 244 relating to creation of a content and management of a virtual currency may be mounted on a first server device, and response holding portion 220, response management module 224, user registration information holding portion 230, and user registration information management module 234 relating management of a user may be mounted on another second server device. In this case, various types of processing in the present embodiment may be implemented by communication of information processing device 100 with both server devices. Alternatively, various types of processing in the present embodiment may be implemented by coordination between both server devices.

Namely, how to mount each function shown in FIG. 5 is not limited to the configuration shown in FIG. 5, and any form of mount can be adopted in accordance with a technical level or required performance at each time point.

E. Processing Procedure

Figure 6:
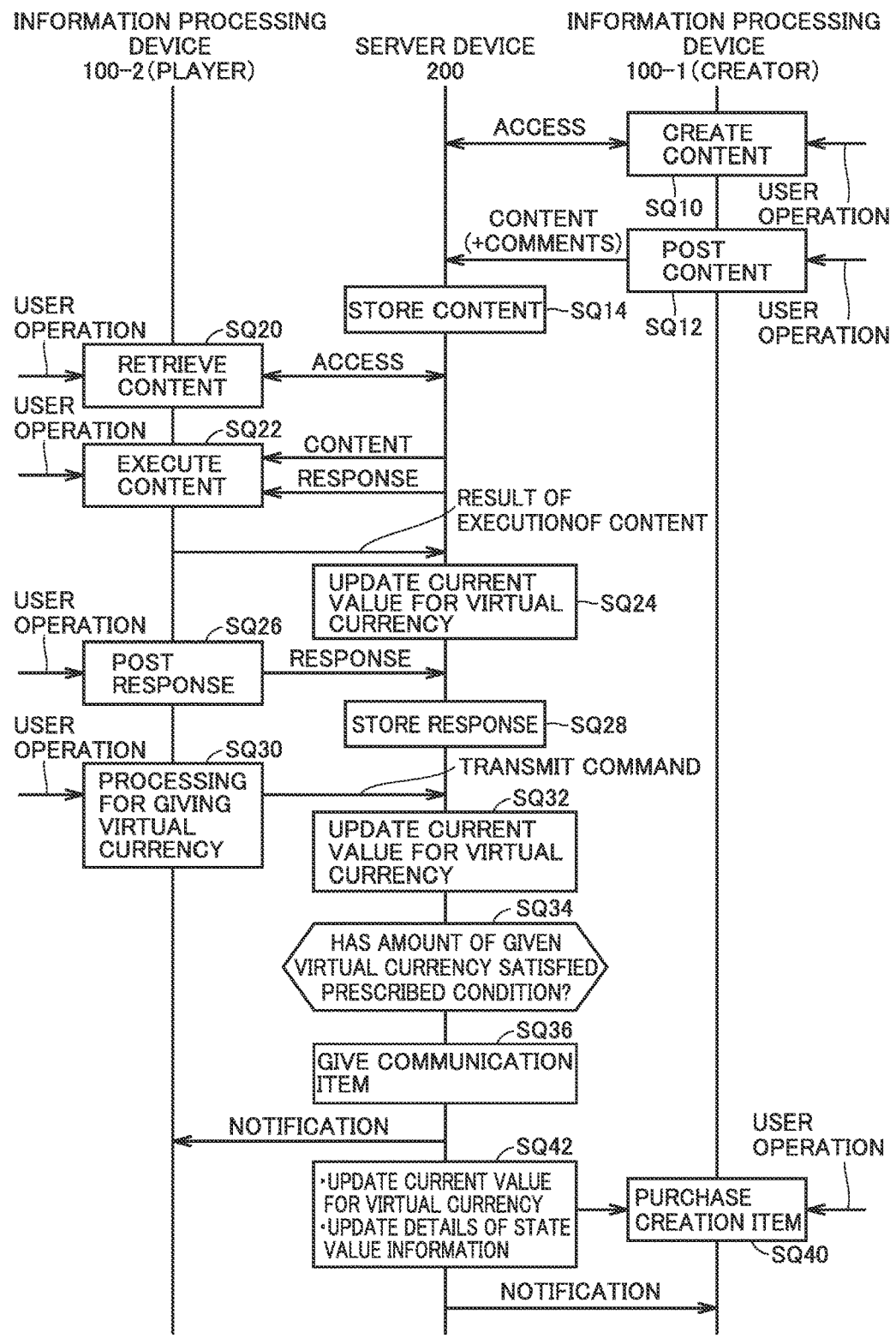
FIG. 6 shows an exemplary illustrative non-limiting sequence diagram showing a processing procedure involved with information processing in the present embodiment.

A processing procedure involved with information processing in the present embodiment will now be described. FIG. 6 shows a case that, for accessing server device 200, a user as creator 10 operates an information processing device 100-1 and a user as player 20 operates an information processing device 100-2 for the sake of convenience of description. Information processing shown in FIG. 6 can be performed by one computer or a plurality of computers, and any form of mount can be adopted therefor. In mount on a computer, each processing described below is performed by having one or more processors such as a CPU execute a program.

Referring to FIG. 6, creator 10 creates a content by operating information processing device 100-1 (sequence SQ10). Here, information processing device 100-1 accesses server device 200, obtains registration information 232 (FIG. 5) or state value information 242 (FIG. 5) relating to creator 10, and displays the information on display 106 (FIG. 2). Transmission of such information to information processing device 100-1 is managed by user registration information holding portion 230 and user state value holding portion 240 (both in FIG. 5) of server device 200.

Figure 7:
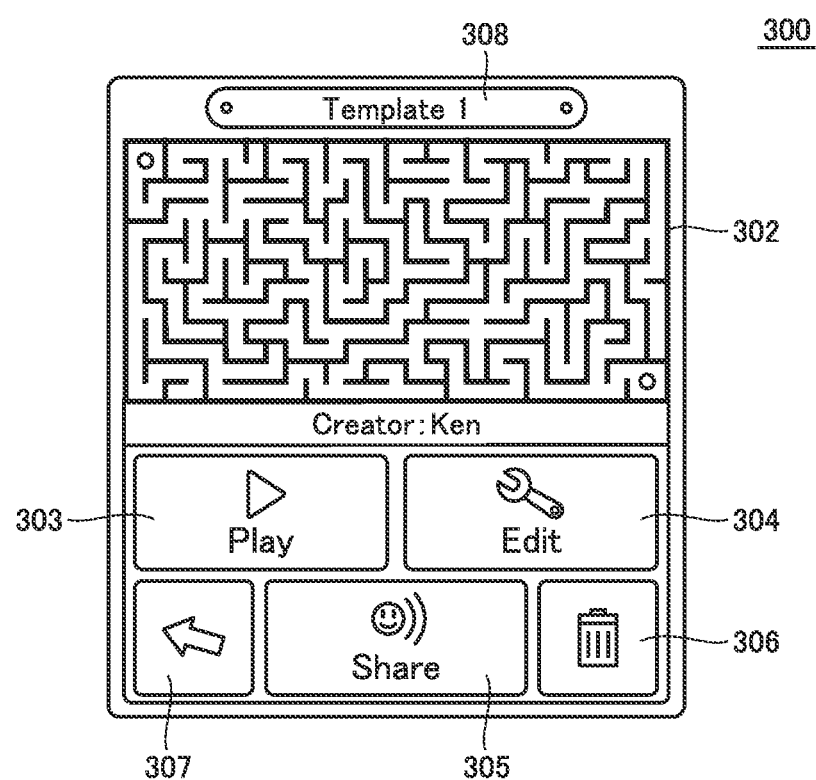
FIG. 7 shows an exemplary illustrative non-limiting diagram showing one example of a display screen during creation of a content, which is displayed on a display of the information processing device.

Referring to FIG. 7, display screen 300 includes a play button 303, an edit button 304, a post button 305, a delete button 306, and a back button 307 in addition to a display area 302 where a content is displayed.

In display area 302, a content which was created or is being created by creator 10 is displayed. When play button 303 is selected, game processing based on a content displayed on display area 302 is started, and when edit button 304 is selected, an operation for edition of the content displayed in display area 302 is activated. When delete button 306 is selected, a content which is being created is deleted. When back button 307 is selected, a content creation screen returns to a menu screen. Comments can optionally be input in a comment field 308 by creator 10.

When post button 305 is selected, a created content is posted. Namely, as shown in FIG. 6, in response to an operation to select post button 305 by creator 10, information processing device 100-1 posts the created content to server device 200 (sequence SQ12). Here, the content is uploaded to server device 200. Then, server device 200 stores the content received from information processing device 100-1 together with identification information indicating a creator (user) who is a sender (sequence SQ14). Thus, information processing system 1 has a function to accept a posting of a content created by a user (creator 10) while game processing is performed.

Player 20 searches for a target content by operating information processing device 100-2 (sequence SQ20). Information processing device 100-2 has a function to access a content created by a creator, and obtains a thumbnail of a content or various types of information held in server device 200 by accessing server device 200 and displays the thumbnail or information on display 106 (FIG. 2). Namely, processing for providing a content created by the first user (creator 10) to the second user (player 20) is performed.

Figure 8:
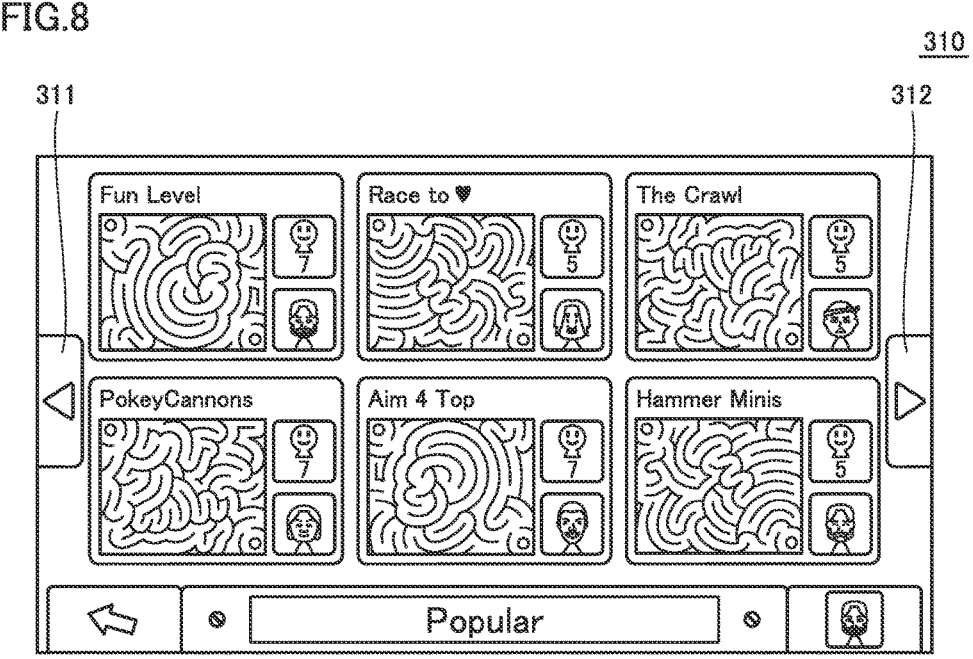
FIG. 8 shows an exemplary illustrative non-limiting diagram showing one example of a display screen during search for a content, which is displayed on the display of the information processing device.

In display screen 310 shown in FIG. 8, contents selected by a user or extracted in accordance with a prescribed retrieval condition are displayed in a list. Display screen 310 includes move buttons 311 and 312. When move button 311 or move button 312 is selected, contents displayed in a list are successively switched. A user can select a content which has caught sight of the user by changing a retrieval condition or by successively selecting a move button.

Figure 9:
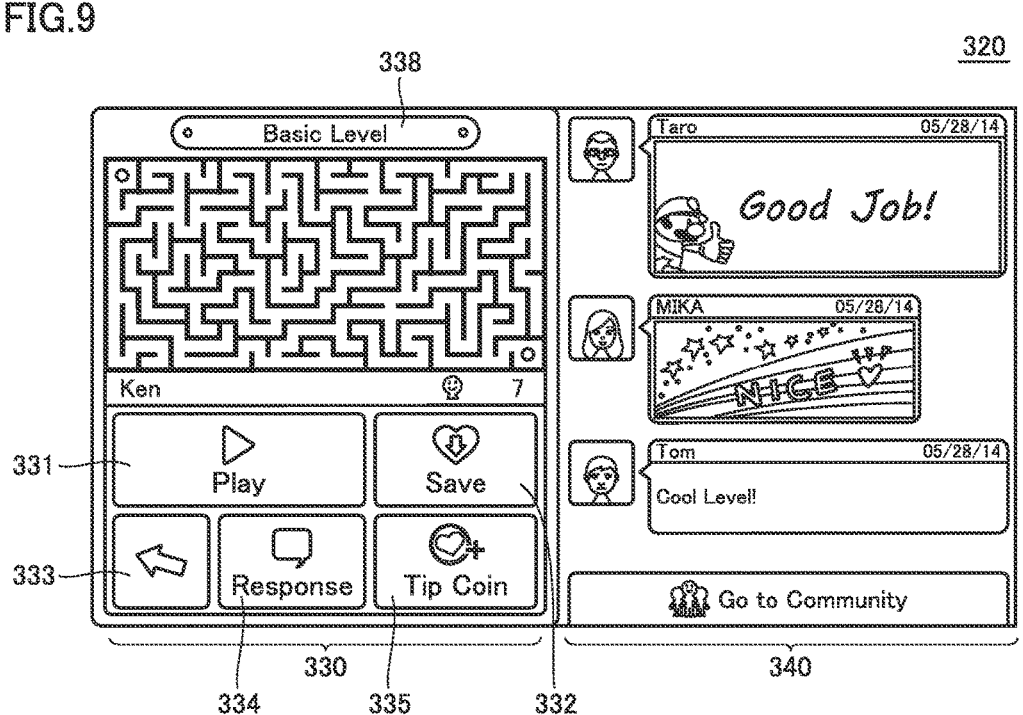
FIG. 9 shows an exemplary illustrative non-limiting diagram showing one example of a display screen during display of a content, which is displayed on the display of the information processing device.

When player 20 selects any content on display screen 310 shown in FIG. 8, a selected content is displayed. Referring to FIG. 9, display screen 320 includes a display area 330 where a selected content is displayed and a display area 340 where a response to the selected content is displayed. Namely, the selected content and a response associated with the content are provided together. Display area 330 includes a play button 331, a save button 332, a back button 333, a response posting button 334, and a tip button 335.

Comments input by creator 10 on a displayed content are displayed in a comment display field 338. Thus, a content and comments from creator 10 are together provided on display screen 320.

When play button 331 is selected, game processing based on a content displayed in display area 330 is started. Then, as shown in FIG. 6, in response to an operation to select play button 331 by player 20, information processing device 100-2 starts game processing based on a selected content and transmits a result of the game processing (a result of execution of a content) to server device 200 (sequence SQ22).

With execution of the content by player 20, a virtual currency is given to player 20 and creator 10 who is a creator of the executed content. From a point of view of the system, server device 200 updates a current value for the virtual currency associated with each of player 20 and creator 10 (sequence SQ24).

Thus, information processing system 1 has a function to give an acquisition (a virtual currency and/or an item relating to game processing) to player 20 in accordance with execution of game processing. When a prescribed condition is satisfied through play by a user, game processing itself for giving an acquisition to the user may be performed in information processing device 100-2.

Though FIG. 6 exemplifies a form in which server device 200 manages a current value for a virtual currency associated with each user, the form is not limited thereto. For example, processing for giving a virtual currency from a certain user to another user may be implemented by each information processing device 100 managing a current value for a virtual currency associated with a user who operates a user's own device and server device 200 mediating exchange among information processing devices 100.

Referring again to FIG. 9, when save button 332 is selected, the content downloaded from server device 200 is stored in information processing device 100-2. Even when information processing device 100-2 cannot access server device 200, player 20 can execute the content stored in information processing device 100-2 without restriction.

When back button 333 is selected, a content selection screen returns to the menu screen.

When response posting button 334 is selected, input and posting of a response to the selected content are activated. When player 20 inputs a response including any message or a stamp and selects an enter button after response posting button 334 is selected, the response is transmitted to server device 200. Then, as shown in FIG. 6, in response to an operation by player 20, information processing device 100-2 posts the input response to server device 200 (sequence SQ26). Namely, the response is uploaded to server device 200. Server device 200 stores a response received from information processing device 100-2 together with identification information indicating the content selected by player 20 who is a sender (sequence SQ28). Thus, information processing system 1 has a function to accept a response from a user for each content. This function accepts a response created by a player while game processing is performed.

Referring again to FIG. 9, when tip button 335 is selected, processing for giving a virtual currency possessed by player 20 to creator 10 who has created the selected content is started. Then, as shown in FIG. 6, in response to an operation by player 20, information processing device 100-2 performs processing for giving a virtual currency to creator 10 who has created the selected content (sequence SQ30). Namely, information processing system 1 has a function to transfer an acquisition given to the user to another user in response to an instruction from the user. In other words, information processing system 1 has a function to transfer an acquisition acquired by a user when a prescribed condition is satisfied in game processing to another user in response to an instruction from the user.

Figure 10:
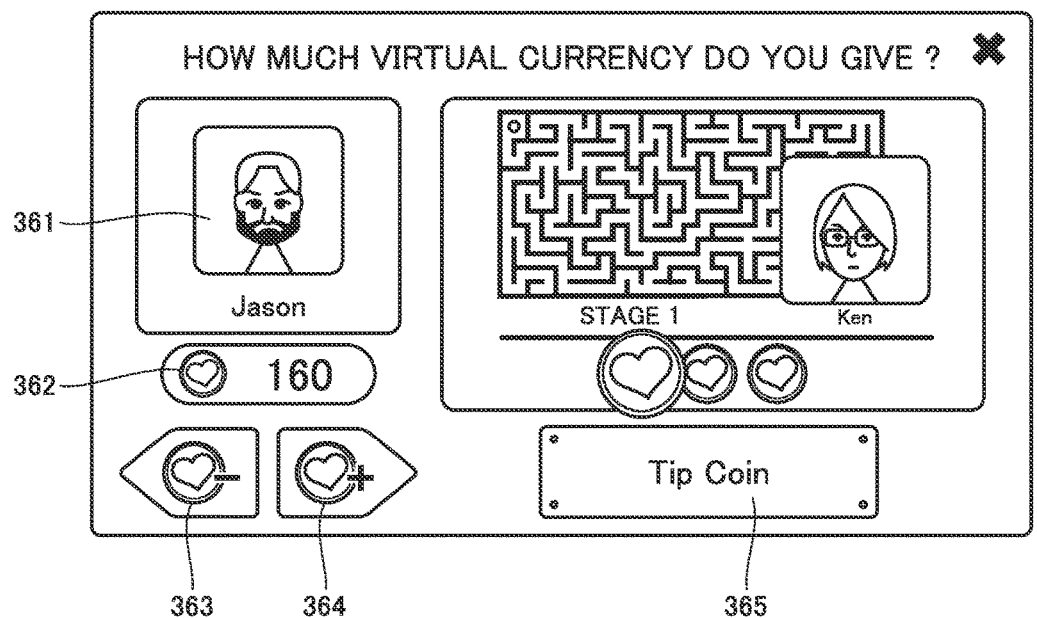
FIG. 10 shows an exemplary illustrative non-limiting diagram showing one example of a display screen in processing for giving a virtual currency, which is displayed on the display of the information processing device.

Referring to FIG. 10, display screen 360 displays a value 362 for a virtual currency possessed by player 20 together with a character 361 representing player 20 who is operating. In addition, display screen 360 also displays the selected content and a character representing creator 10 who created the content. Player 20 can set as appropriate an amount of a virtual currency to be given to creator 10 by operating a plus button 364 and a minus button 363.

Finally, when a submit button 365 is selected, a set amount (or a number or a value) of a virtual currency is given to creator 10. More specifically, in response to selection of submit button 365 in display screen 360 shown in FIG. 10, a command to transfer a virtual currency is transmitted from information processing device 100-2 to server device 200. Namely, in response to an input from the second user (player 20) as appreciation of a content created by the first user (creator 10), information processing device 100-2 transmits a command for making change such that the entirety or a part of a virtual currency associated with the second user (player 20) is associated with the first user (creator 10). In other words, information processing device 100-2 has a function to transmit, in response to an instruction from a user, a command for transferring a part or the entirety of an acquisition associated with the user to another user.

Server device 200 transfers a designated amount of a virtual currency associated with player 20 to creator 10 in accordance with a command from information processing device 100-2. From a point of view of the system, server device 200 updates a current value for a virtual currency associated with each of player 20 and creator 10 (sequence SQ32). Namely, processing for managing a virtual currency in association with each of the first user (creator 10) and the second user (player 20) is performed. Processing for managing a virtual currency includes processing for making change such that the entirety or a part of a virtual currency associated with the second user (player 20) is associated with the first user (creator 10) in response to an instruction from the second user (player 20), as appreciation of a content created by the first user (creator 10).

Furthermore, server device 200 determines whether or not an amount of a virtual currency given by player 20 to creator 10 satisfies a prescribed condition (sequence SQ34). More specifically, when a total of a virtual currency given by player 20 to creator 10 reaches a prescribed threshold value, it is determined that a prescribed condition has been satisfied. When it is determined that the prescribed condition has been satisfied, server device 200 gives a communication item to player 20 (sequence SQ36). Namely, information processing system 1 gives an item supporting communication among users to the first user (creator 10) in response to transfer by the first user (creator 10) of an acquisition to the second user (player 20).

Giving a communication item may be implemented by internal processing in information processing device 100. In this case, for example, instead of giving a communication item from server device 200, data on one communication item or a plurality of communication items is included as a part of a game content executed in information processing device 100, and by managing an item which can be used by each user among these communication items, processing which appears to a user as giving of a communication item may be implemented. Namely, all communication items may be locked in advance, and when any communication item is designated as an item to be given as compensation for transfer of an acquisition, that communication item may be unlocked. Determination as to whether or not an amount of a virtual currency given by player 20 to creator 10 has satisfied a prescribed condition (sequence SQ34) may also be made by information processing device 100 instead of server device 200, or made by information processing device 100 and server device 200 in coordination.

More specifically, server device 200 updates details of state value information 242 (FIG. 5) corresponding to player 20 of interest and activates possession of a communication item. When a communication item is given to player 20, server device 200 notifies information processing device 100-2 of the fact that the communication item has been given.

Figure 11:
FIG. 11 shows an exemplary illustrative non-limiting diagram showing one example of a display screen at the time when a communication item is acquired, which is displayed on the display of the information processing device.

Referring to FIG. 11, player 20 is notified of the fact that he/she has acquired a communication item (in this example, a stamp).

On the other hand, creator 10 can purchase a creation item by operating information processing device 100-1 and using a virtual currency possessed by creator himself/herself. As shown in FIG. 6, creator 10 purchases a creation item by operating information processing device 100-1 and accessing virtually provided store 2 (sequence SQ40). Here, information processing device 100-1 obtains information on an amount of a virtual currency possessed by creator 10 and on a creation item provided by store 2 by accessing server device 200, and displays the information on display 106 (FIG. 2).

Figure 12:
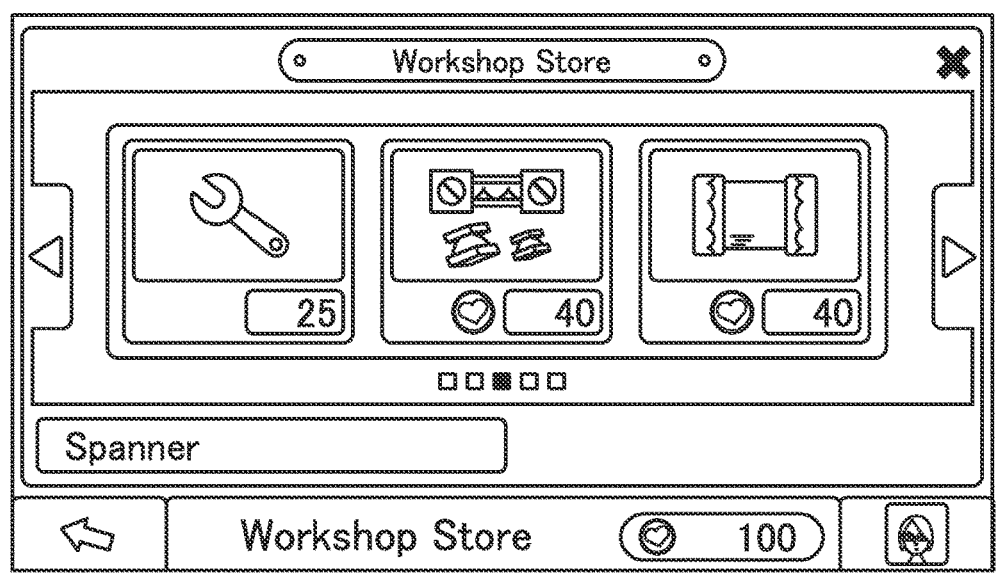
FIG. 12 shows an exemplary illustrative non-limiting diagram showing one example of a display screen at the time of purchase of a creation item, which is displayed on the display of the information processing device.

Referring to FIG. 12, display screen 380 displays a list of creation items which can be purchased at store 2 and an amount of a virtual currency possessed by creator 10. Creator 10 performs an operation for purchase by selecting a target creation item. Then, as shown in FIG. 6, information is exchanged between information processing device 100-1 and server device 200, and server device 200 updates a current value for a virtual currency associated with each of player 20 and creator 10 and updates details of state value information 242 (FIG. 5) corresponding to creator 10 of interest (sequence SQ42). Server device 200 notifies information processing device 100-1 of details after update processing.

Though FIG. 6 shows all processing procedures involved with information processing in the present embodiment for the sake of convenience of description, only a part of such processing may be performed and timing when the processing is performed may not be successive. Namely, in an actual operation, the entirety or a part of processing shown in FIG. 6 may be performed as appropriate without departing the gist of the subject invention.

F. Advantages

According to information processing system 1 in the present embodiment, a player accesses any content and can give a virtual currency to a creator who has created the content as appreciation of the content. By receiving a virtual currency from the player, the creator can obtain a motivation for creation of a content. On the other hand, the player can acquire a special item as a reward for giving a virtual currency to the creator of a content he/she liked. For the player, acquisition of a special item is a motivation to give a virtual currency possessed by the player himself/herself to the creator. As a player accesses a content, both of the player and a creator who has created the content are given a virtual currency.

Thus, the creator is given a motivation to create a new content, and the player is given a motivation to access a content and a motivation to give a virtual currency to the creator. Thus, creation and use of a content is invigorated in the system as a whole.

The present invention aims to present an item acquired by a user himself/herself as appreciation of a content created by another user.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims. The word "comprising" does not exclude the presence of elements or steps other than those listed in a claim. The word "a" or "an" preceding an element does not exclude the presence of a plurality of such elements.

What is claimed is:

1. An information processing system, comprising a server device and a plurality of information processing devices, the server device being configured to:
provide a game content created by a first user of a first information processing device to a second information processing device operated by a second user, the game content being stored in association with an identifier identifying the first user;
manage virtual currencies in association with the first and second users respectively;
receive a command from the second information processing device, the command requesting transferring a designated amount of the virtual currency associated with the second user to the first user;
in response to the command received from the second information processing device, transfer the designated amount of the virtual currency associated with the second user to the first user, as appreciation of the game content created by the first user;
upon transferring the designated amount of virtual currency associated with the second user to the first user, determine whether the designated amount of the virtual currency transferred to the first user satisfies a prescribed condition; and
upon determining that the designated amount satisfies the prescribed condition, transfer a reward to the second user.

2. The information processing system according to claim 1, wherein the server device is further configured to:
present the game content to the second user and have the second user make use of the game content.

3. The information processing system according to claim 1, wherein the server device is further configured to hold the game content created by the first user in a manner sharable with other users.

4. The information processing system according to claim 3, wherein the server device is further configured to:
hold game contents created by a plurality of users, and
in response to an input from the second information processing device, select one of the plurality of users to which the virtual currency associated with the second user is to be transferred.

5. The information processing system according to claim 4, wherein the server device is further configured to:
hold comments from the first user together with the content from the first user, and
provide the game content and the comments from the first user together.

6. The information processing system according to claim 1, further comprising a game processing system including at least one processor, the game processing system being configured to perform game processing, wherein the server device is further configured to, when a prescribed condition is satisfied in the game processing when being played by a user, increase virtual currency associated with the user.

7. The information processing system according to claim 1, wherein the server device is further configured to:
accept a response to a game content from the second user; and
hold the response from the second user in association with the game content.

8. The information processing system according to claim 1, wherein the reward includes an item which can be used for communication among users.

9. The information processing system according to claim 1, wherein the server device is further configured to, in response to an instruction from a user, decrease the virtual currency associated with the user and give the user an item which can be used for creating a game content.

10. The information processing system according to claim 1, wherein the server device is further configured to:
in response to provision of the game content created by the first user to the second user, increase the virtual currency associated with the first user and the virtual currency associated with the second user.

11. The information processing system according to claim 1, wherein the designated amount of virtual currency to be transferred to the first user is determined based on at least one button input from the second user.

12. The information processing system according to claim 1, wherein the second information processing device issues the command upon receipt a button input from the second user.

13. The information processing system according to claim 1, wherein the designated amount is designated via a user interface indicating the designated amount of virtual currency is transferred to the first user in appreciation of the game content created by the first user, the user interface being generated on the second information processing device.

14. An information processing method performed by one computer or a plurality of computers, comprising:
providing a game content created by a first user of a first information processing device to a second information processing device operated by a second user, the game content being stored in association with an identifier identifying the first user;
managing virtual currencies in association with the first and second users respectively,
receiving a command from the second information processing device, the command requesting transferring a designated amount of the virtual currency associated with the second user to the first user;
in response to the command received from the second information processing device, transferring the designated amount of the virtual currency associated with the second user to the first user, as appreciation of the game content created by the first user;
upon transferring the designated amount of virtual currency associated with the second user to the first user, determining whether the designated amount of the virtual currency transferred to the first user satisfies a prescribed condition; and
upon determining that the designated amount satisfies the prescribed condition, transferring a reward to the second user.

15. An information processing device, comprising a communication interface and one or more processors, the one or more processors being configured to:

access a game content created by a first user of a first information processing device, the game content being stored in a server device in association with an identifier identifying the first user;

receive an input from a second user of the information processing device; and in response to the input received from the second user, transmit, via the communication interface, to the server device a command for transferring a designated amount of the virtual currency associated with the second user to the first user, as appreciation of the game content created by the first user, wherein the server device manages virtual currencies in association with the first and second users respectively and the designated amount of virtual currency to be transferred to the first user is determined based on an input received from the second user, wherein, upon transferring the designated amount of virtual currency associated with the second user to the first user, determine whether the designated amount of the virtual currency transferred to the first user satisfies a prescribed condition; and upon determining that the designated amount satisfies the prescribed condition, transfer a reward to the second user.

16. A non-transitory storage medium encoded with a computer readable information processing program executed by one or more processors of an information processing device, the information processing program causing the one or more processors to:

access a game content created by a first user of a first information processing device, the game content being stored in a server device in association with an identifier identifying the first user;

receive an input from a second user of the information processing device; and in response to the input received from the second user, transmit, to the server device a command for transferring a designated amount of the virtual currency associated with the second user to the first user, as appreciation of the game content created by the first user, wherein the server device manages virtual currencies in association with the first and second users respectively and the designated amount of virtual currency to be transferred to the first user is determined based on an input received from the second user, wherein, upon transferring the designated amount of virtual currency associated with the second user to the first user, determine whether the designated amount of the virtual currency transferred to the first user satisfies a prescribed condition; and upon determining that the designated amount satisfies the prescribed condition, transfer a reward to the second user.

17. An information processing system, comprising a server device and a plurality of information processing devices, the server device being configured to:

enable a first user of a first information processing device to upload a game content created by the first user, store the game content created and uploaded by the first user, enable a second user of a second information processing device to review the game content created by the first user, manage virtual currencies in association with a plurality of users including the first and second users respectively, receive, from the second information processing device, a command requesting for transferring at least a part of the virtual currency associated with the second user to a target user as appreciation of a game content created by the target user, the command specifying the target user and a designated amount of virtual currency to be transferred, wherein the command is generated in response to one or more user inputs received by the second information processing device, in response to the command received from the second information processing device, transfer the designated amount of the virtual currency associated with the second user to the target user, determine whether the designated amount of the virtual currency transferred to the target user satisfies a prescribed condition, and upon determining that the designated amount satisfies the prescribed condition, transfer a reward to the second user.

* * * * *